No. 658,308. Patented Sept. 18, 1900.
G. M. WOOD.
RUNNING GEAR FOR VEHICLES.
(Application filed May 14, 1900.)
(No Model.)
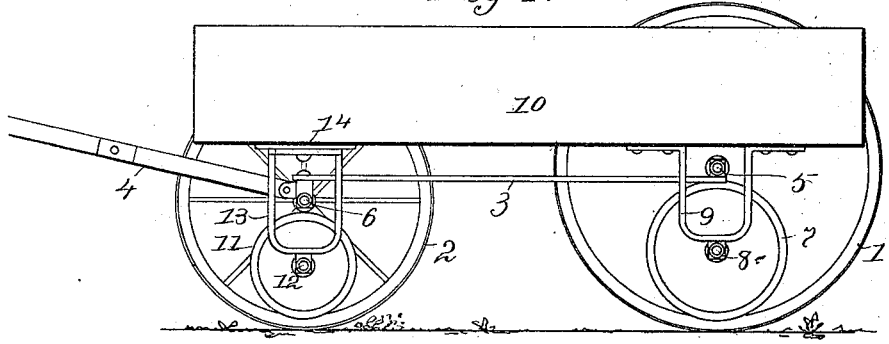
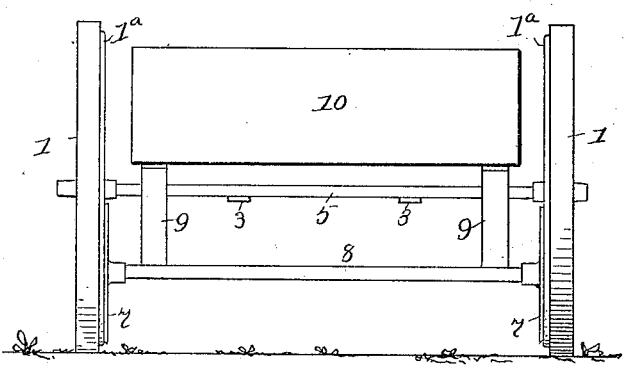
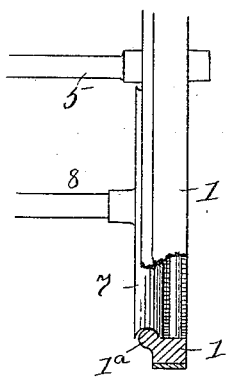
Witnesses
Nora Graham.
Ina Graham
Inventor
George M. Wood,
by L. P. Graham
his attorney

UNITED STATES PATENT OFFICE.

GEORGE M. WOOD, OF DECATUR, ILLINOIS.

RUNNING-GEAR FOR VEHICLES.

SPECIFICATION forming part of Letters Patent No. 658,308, dated September 18, 1900.

Application filed May 14, 1900. Serial No. 16,597. (No model.)

*To all whom it may concern:*

Be it known that I, GEORGE M. WOOD, of the city of Decatur, county of Macon, and State of Illinois, have invented certain new and useful Improvements in Running-Gear for Vehicles, of which the following is a specification.

This invention is intended to facilitate the travel of wagons, carriages, automobiles, and the like. It is exemplified in the structure hereinafter described, and it is defined in the appended claims.

In the drawings forming part of this specification, Figure 1 is a side elevation of a wagon embodying my improvements, the near wheels of the wagon being removed to better show the construction. Fig. 2 is a rear elevation of the rear end of the wagon. Fig. 3 is a detail of a fragment of a tread-wheel and of a load-carrying wheel therein, the tread-wheel being partly broken away to show peculiarities of its construction.

In constructing the particular embodiment of my invention shown in the drawings a set of tread-wheels 1 and 2 are made with inwardly-extending flanges on their fellies, as shown at 1ᵃ in Figs. 2 and 3. The axles 5 and 6 of the two pairs of tread-wheels are connected by means of an ordinary reach or coupling-pole 3, and the tongue 4 is connected with the front axle 6. Upon the flanges of the tread-wheels are mounted a set of load-bearing wheels 7 and 11, such wheels having their faces shaped to embrace the flanges of the tread-wheels, and the wheels 7 and 11 turn on axles 8 and 12, respectively. Yoke-formed supports 9 are fastened onto the rear axle 8, and they extend upward to the wagon-box 10. Similar supports 13 are fastened onto axle 12, and they extend upward to a fifth-wheel or bolster 14, which is connected with the bed or box. The supports for the bed straddle the axles of the tread-wheels out of contact therewith, and they rise above these axles sufficiently far to hold the bed out of contact therewith, and so the bed and its load are supported entirely from axles 8 and 12.

Wheels 1 and 2, axles 5 and 6, reach 3, and tongue 4 constitute a tread and draft structure as the wheels run on the ground, and whatever force is required to draw or propel the vehicle is applied to some part of this structure. The bed 10, the supports 9 and 13, the axles 8 and 12, and the wheels 7 and 11 constitute a load-carrying structure mounted on the flanges of the tread-wheels and otherwise disconnected from the draft structure. The yoke formation of the supports 9 and 13 permits the two structures to have a limited amount of independent horizontal motion lengthwise of the wagon, and this is an essential condition.

As the draft structure is moved forward or backward the inertia of the load detains the load-bearing structure until the wheels thereof are raised somewhat from their shown lowest position, after which wheels 7 and 11 roll down constantly, forming inclines on the flanges of the tread-wheels, and keep pace with the travel of the tread-wheels.

The structure of the vehicle in regard to shape, form, and proportions is immaterial, as is also the means employed to move the vehicle.

What I claim as new, and desire to secure by Letters Patent, is—

1. A vehicle consisting of a draft or propulsion truck the wheels of which have flanges on their rims, and a load-bearing truck the wheels of which run inside the wheels of the draft-truck on the flanges thereof; the two trucks having independent motion lengthwise of the vehicle, substantially as described.

2. In a vehicle, the combination of a draft-truck composed of tread-wheels, axles therefor and a coupling-pole, and a load-bearing truck composed of wheels running on flanges of the tread-wheels and journaled on axles, a body and supports for the body rising from the load-bearing axles and straddling the axle of the draft-truck, substantially as set forth.

In testimony whereof I sign my name in the presence of two subscribing witnesses.

GEORGE M. WOOD.

Witnesses:
ALBERT BARNES,
L. P. GRAHAM.

It is hereby certified that in Letters Patent No. 658,308, granted September 18, 1900, upon the application of George M. Wood, of Decatur, Illinois, for an improvement in "Running-Gear for Vehicles," errors appear in the printed specification requiring correction, as follows: In line 67, after the word "constantly" and line 68, after the compound word "tread-wheels" the commas should be stricken out; and that the said Letters Patent should be read with these corrections therein that the same may conform to the record of the case in the Patent Office.

Signed, countersigned, and sealed this 2d day of October, A. D., 1900.

[SEAL.]

F. L. CAMPBELL,
*Assistant Secretary of the Interior.*

Countersigned:
  C H. DUELL,
    *Commissioner of Patents.*